United States Patent [19]
Allen

[11] Patent Number: 6,021,739
[45] Date of Patent: Feb. 8, 2000

[54] MODULAR ANIMAL BOARDING SYSTEM

[75] Inventor: Ken Allen, Spring Valley, Ohio

[73] Assignee: The Mason Company, Leesburg, Ohio

[21] Appl. No.: 09/139,250

[22] Filed: Aug. 25, 1998

[51] Int. Cl.[7] .................................................. A01K 1/01
[52] U.S. Cl. ............................................................ 119/458
[58] Field of Search .................................... 119/458, 455, 119/479

[56] References Cited

U.S. PATENT DOCUMENTS

| | | |
|---|---|---|
| 3,087,458 | 4/1963 | Bennett, Jr. . |
| 3,254,627 | 6/1966 | Cross . |
| 3,550,558 | 12/1970 | Sachs . |
| 3,662,713 | 5/1972 | Sachs . |
| 3,726,254 | 4/1973 | Conover .................................. 119/445 |
| 3,768,442 | 10/1973 | Huis ........................................ 119/457 |
| 3,911,634 | 10/1975 | Horowitz et al. . |
| 4,794,879 | 1/1989 | Thom et al. . |
| 5,116,256 | 5/1992 | Allen . |
| 5,174,241 | 12/1992 | Goguen et al. . |
| 5,220,882 | 6/1993 | Jenkins . |
| 5,473,845 | 12/1995 | Livingston et al. . |
| 5,476,066 | 12/1995 | Hoffman . |
| 5,482,005 | 1/1996 | Thom . |
| 5,749,321 | 5/1998 | Ikuse et al. ............................. 119/458 |

Primary Examiner—Peter M. Poon
Assistant Examiner—Yvonne R. Abbott
Attorney, Agent, or Firm—Wood, Herron & Evans L.L.P.

[57] ABSTRACT

A modular animal boarding system has a lower section divided into plural lower runs, each lower run sharing a joint rear wall with a second lower run and doors that open outwardly away from the joint rear wall. Plural upper sections are supported above the lower section. The upper sections have doors that open inwardly generally toward the lower joint rear wall onto a catwalk. The upper sections are provided with a plumbing system so that each upper run has a drain through which waste can be washed, the waste from each run then draining into a single drainpipe, and, thereafter, draining into a floor gutter connected to any suitable waste collection system.

8 Claims, 6 Drawing Sheets

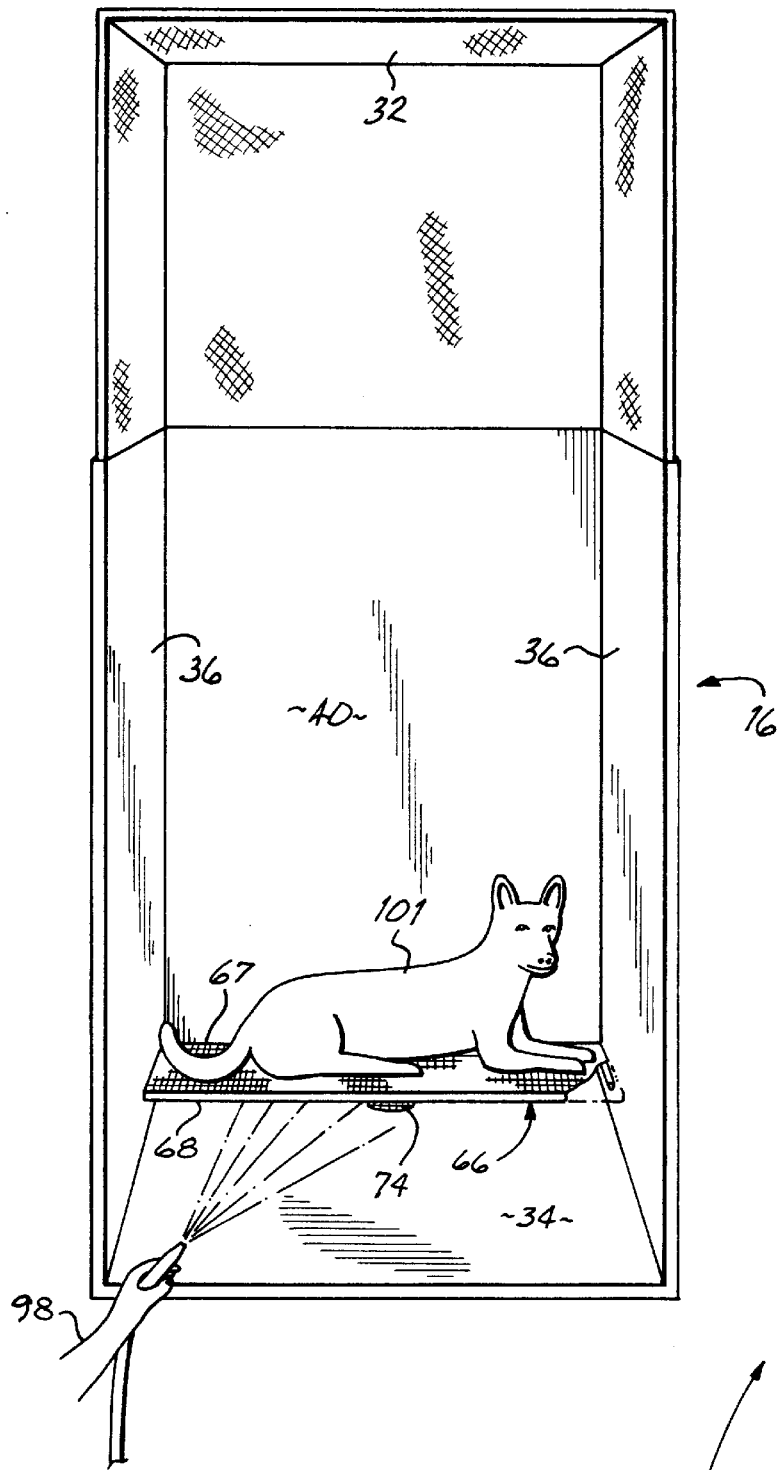
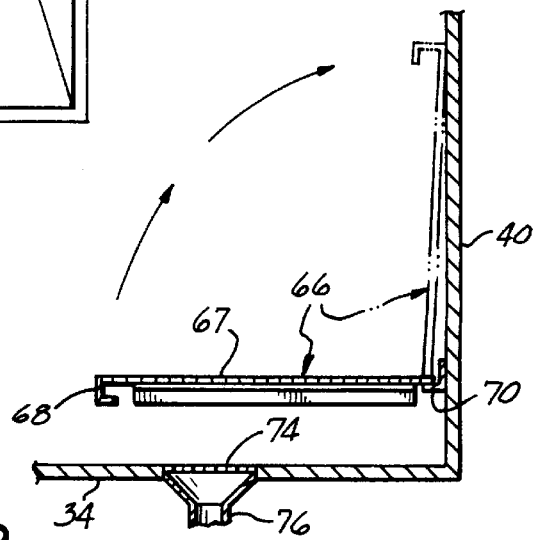
FIG. 7
FIG. 8

MODULAR ANIMAL BOARDING SYSTEM

FIELD OF THE INVENTION

This invention relates to animal kennels. More specifically, this invention relates to a modular animal kennel boarding system.

BACKGROUND OF THE INVENTION

Animal boarding systems known in the art have a number of drawbacks that impact negatively on both the user and the animal boarder. Traditional boarding systems tend to be constructed from monolithic units which require large areas of floor space, and if used indoors, specialized single use buildings to accommodate the kennels.

Animal boarding systems with these problems are shown in U.S. Pat. Nos. 3,662,713; and 3,087,458. The '713 patent discloses a boarding system made of discrete monolithic animal runs that are stacked one on top of another. The kennel system of the '458 patent also uses discrete runs of singular construction. Because each run of the boarding systems in these patents is an autonomous unit, a kennel constructed from these runs is difficult and time consuming to assemble as well as to move from location to location or rearrange within a single location.

Also, traditional kennel systems tend to be problematic to clean. When animal boarders are confined for any appreciable length of time each animal run needs to be washed of the boarder's waste on a regular basis in order to prevent spread of disease from animal to animal and ensure a safe and comfortable environment for the animal as well as for those who maintain an animal boarding system. In the traditional boarding systems, usually either an animal boarder must be removed from its respective animal run so the user may clean, or the user must clean around an animal, potentially to that animal's discomfort, e.g., if an animal run is washed with a hose the animal may get wet, or such a cleaning may be dangerous to the user, e.g., if a temperamental animal must be removed from its run during cleaning, the user is placed in direct contact with the unfriendly animal and susceptible to biting or other injury.

Finally, traditional kennel systems generally have not succeeded in addressing how to gain access to a run as easily as possible for both the user and the animal boarder, particularly if the boarding system has plural levels of animal runs as required to minimize floor space for indoor boarding. These stacked animal run systems have in the past had kennel doorways on the upper runs that simply opened into space above the lower runs so that a user or attendant had to physically lift an animal boarder up off the floor and into the run or down from the kennel to the floor. As mentioned above, whenever a user comes into direct contact with an unfriendly animal, the attendant is put at risk to personal bodily harm and even if the animal is friendly, the attendant is subject to back injury from the lifting.

Also, traditional boarding systems often have more than one animal run sharing a common doorway. Again, this potentially puts a user in harm's way when coming into contact with more than one animal in order to fetch a single animal. When multiple animal runs have one common entrance cleaning the multiple runs also becomes more difficult. The animal boarders occupying a first run must be moved into an adjacent run, which shares the common entrance so that a user may clean the first run, and then the animal boarders must be moved back into the first run in order for the user to clean out the second run. Of course, the problem is further exacerbated when more than two animal runs share a common entrance.

OBJECTIVES OF THE INVENTION

It is therefore an object of the present invention to provide a modular animal boarding system with plural upper modular sections opening inwardly onto a catwalk, the upper modular sections and catwalk being supported above a lower modular section opening outwardly relative to the catwalk.

It is another object of the present invention to provide a modular animal boarding system that may be constructed indoors in very nearly any multiple purpose building so long as the building has adequate floor area and sound proofing.

It is a further object of the present invention to provide a modular animal boarding system with plural upper and lower kennels, each modular section being subdivided into distinct animal runs, each animal run having a waste collection drain that empties into a suitable waste collection system.

It is also an object of the present invention to provide a modular animal boarding system with plural animal runs, each animal run having a foldable bench that allows a user to easily wash clean a run while an animal remains in the run.

SUMMARY OF THE INVENTION

The preceding objectives are accomplished with the present inventive modular animal boarding system having a multiple run lower section and plural run upper sections that may be quickly erected at any desired location having access to an adequate waste collection system.

The upper section is supported above the lower section by a support frame. The lower section is subdivided into plural lower runs, each lower run having a rear wall in common with an oppositely disposed lower run. Each lower run has its own doorway to provide access to an animal boarder, the doorway opening away from its rear wall, common to the oppositely disposed run. The upper sections are comprised of discrete upper runs, each run having a door that opens inwardly, generally toward the lower section common rear wall. Each upper run also has a drain in fluid communication with a plumbing system so that a user may wash out the upper run of animal waste. Each upper run drain is in fluid communication with a single common drain pipe that empties into a gutter defined in the floor of any suitable location having access to an adequate waste collection system. Each upper and lower run has a foldable bench that the animal boarder is quickly conditioned to jump onto when a user hoses off the run's floor. A user may also fold the bench up against the run's rear wall to allow a thorough cleaning of the run while the run is unoccupied as well as to gain access to a drain located beneath the bench.

The upper sections open generally toward the lower joint rear wall, as mentioned above. Interposed between the upper runs, and forming part of the support frame, is a catwalk that the user and animal boarder use to access the upper runs so as to not walk directly upon lower run ceilings. In the center of the catwalk, running along its length, is a grate covering a catwalk gutter with a catwalk drain in fluid communication with the drain pipe so that a user may clean the catwalk of any animal waste, and that waste may drain into the drain pipe, into the floor gutter, and thereafter into the waste collection system.

Because the lower section and upper sections are constructed from distinct modular parts, i.e., each run is not monolithic, the boarding system is easily locateable and quickly constructed at any suitable desired location.

The features and objectives of the present inventive modular animal boarding system will become more readily apparent from the following Detailed Description taken in conjunction with the accompanying drawings.

BRIEF DESCRIPTION OF THE DRAWINGS

FIG. 7 is a perspective view of a single upper run;

FIG. 8 is a cross sectional side view of a run bench taken along line 8—8 of FIG. 7.

DETAILED DESCRIPTION OF THE PREFERRED EMBODIMENT

Figure 1:
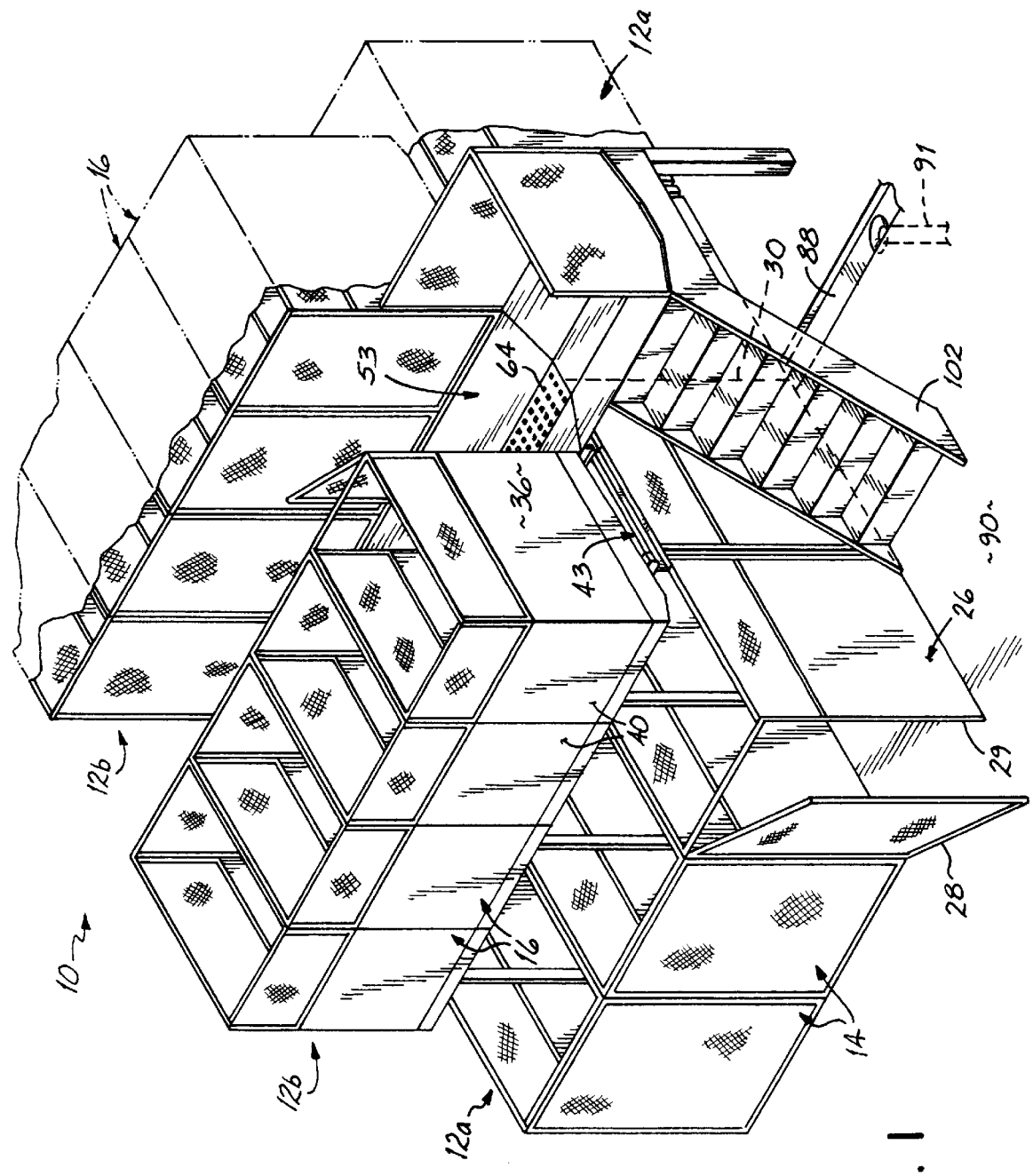
FIG. 1 is a perspective view of a modular animal boarding system according to the present invention.
Figure 9:
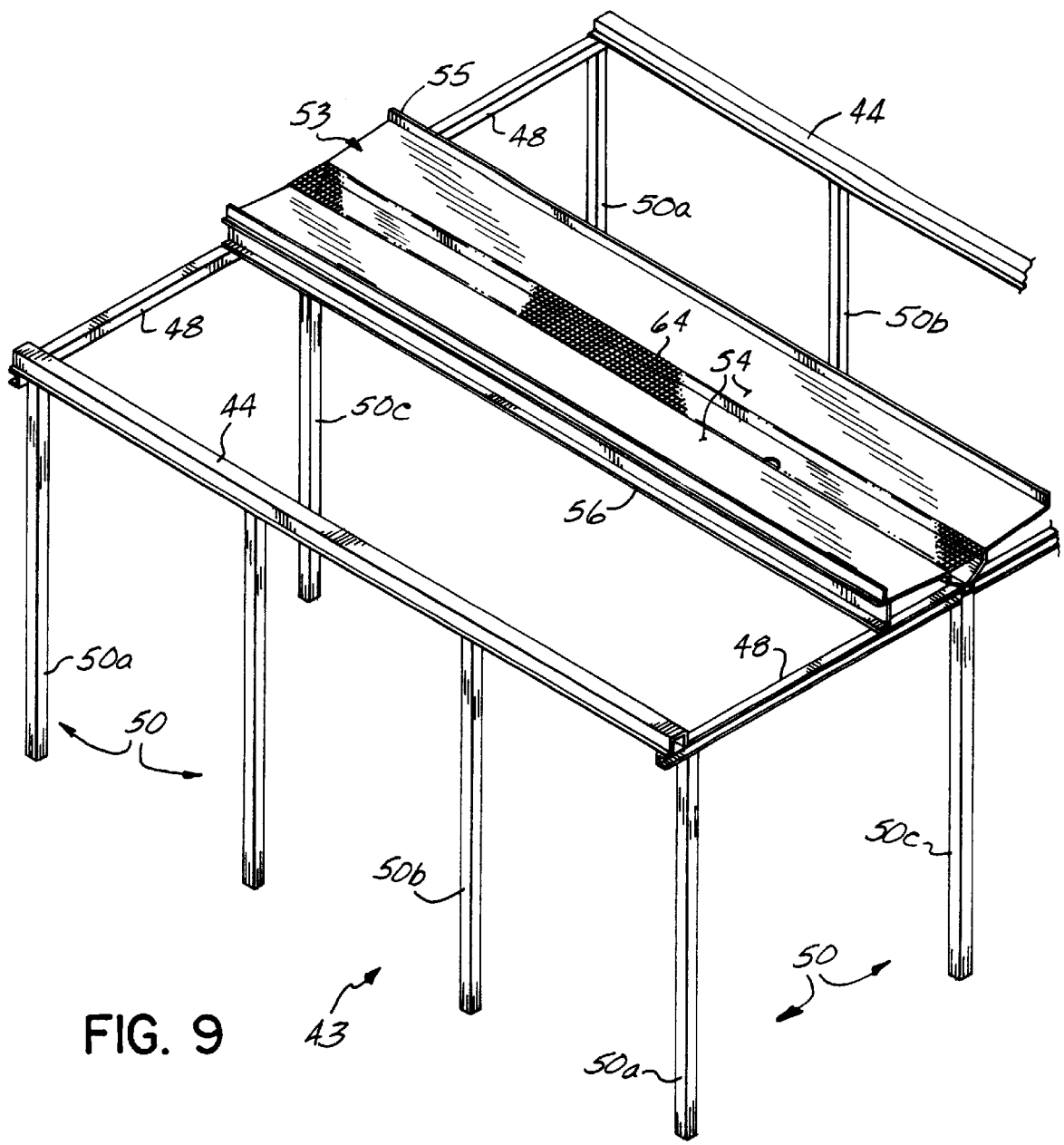
FIG. 9 is a perspective view of a support frame.

As seen in FIG. 1, a single module of a modular boarding system 10 has a lower section 12a and plural upper sections 12b. The upper sections 12b are supported above the lower section 12a by a support frame 43 as seen in FIG. 9. The support frame 43 comprises vertical support columns 50a, 50b, 50c, transverse channel bars 48, hat shaped longitudinal beams hereinafter referred to as hat beams 44, longitudinally extending catwalk beams 56, a longitudinally extending catwalk 53 comprised of catwalk members 54, and a longitudinally extending catwalk gutter 92.

Figure 2:
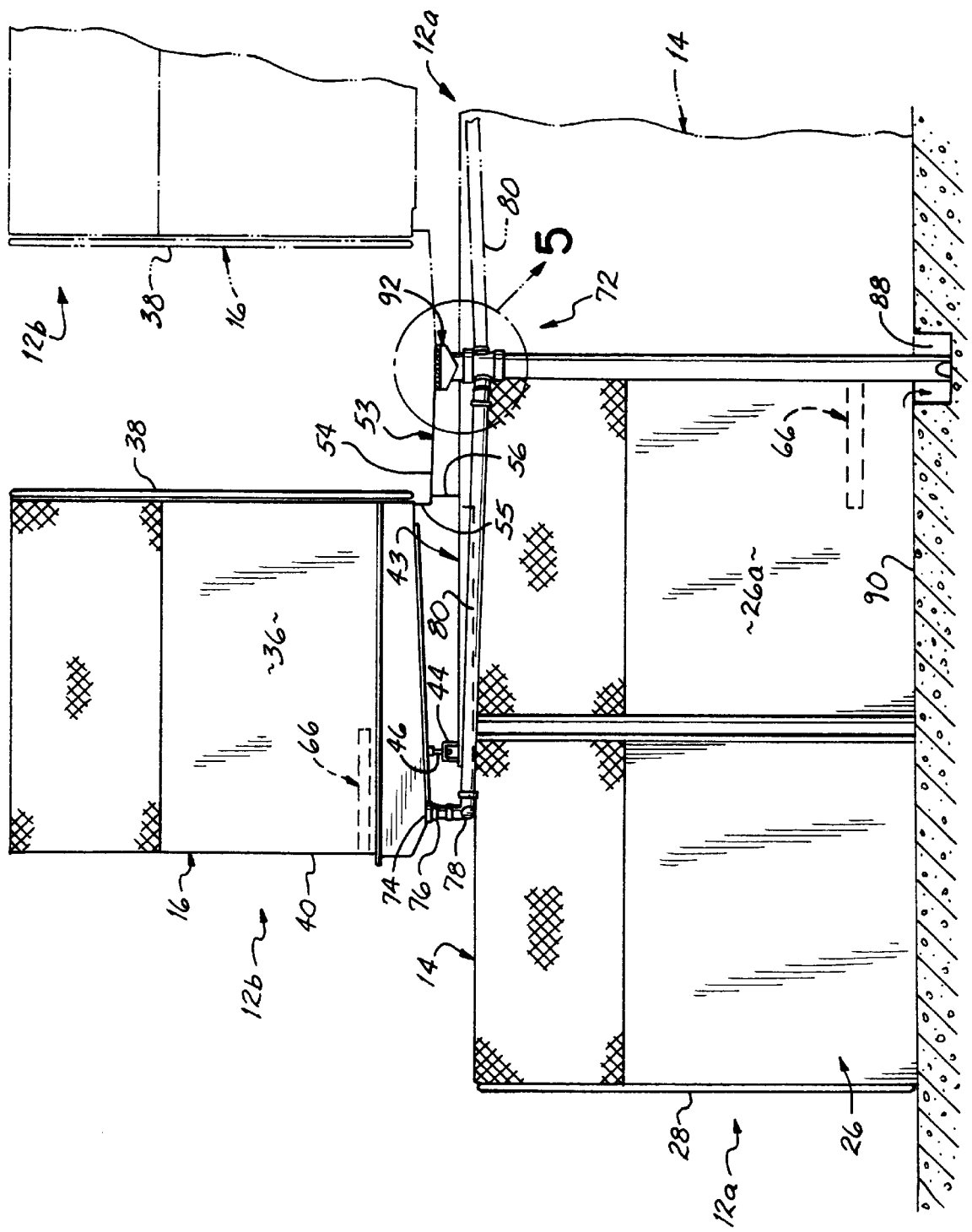
FIG. 2 is a partial end view of upper and lower sections of the present invention.

Each upper section kennel has a bottom floor 34, the front edge of which rests upon and is supported from an upturned margin or flange 55 of the catwalk member 54. As seen in FIG. 2, the longitudinally extending hat beams 44 have leveling members 46 that support and help to level the upper kennel section 12b. The outer edges of the catwalk member 54 rest upon and are supported from a pair of catwalk beams 56. Both the longitudinally extending catwalk beams 56 and the longitudinally extending hat beams 44 rest upon and are supported from the transversely disposed channel bars 48. The transverse channel bars 48 are in turn supported by the vertical columns 50a. The longitudinally extending hat beams 44 are also supported medially of their ends by the vertical columns 50b that are interposed at spaced intervals between the endmost vertical columns 50a. The longitudinally extending center section of the catwalk 53 is a catwalk grate 64 beneath which there is a catwalk gutter 92. The generally V-shaped catwalk gutter 92 is supported at its base 93 by either the transversely extending channel bars 48 or the top of the innermost vertical columns 50c.

Figure 3:
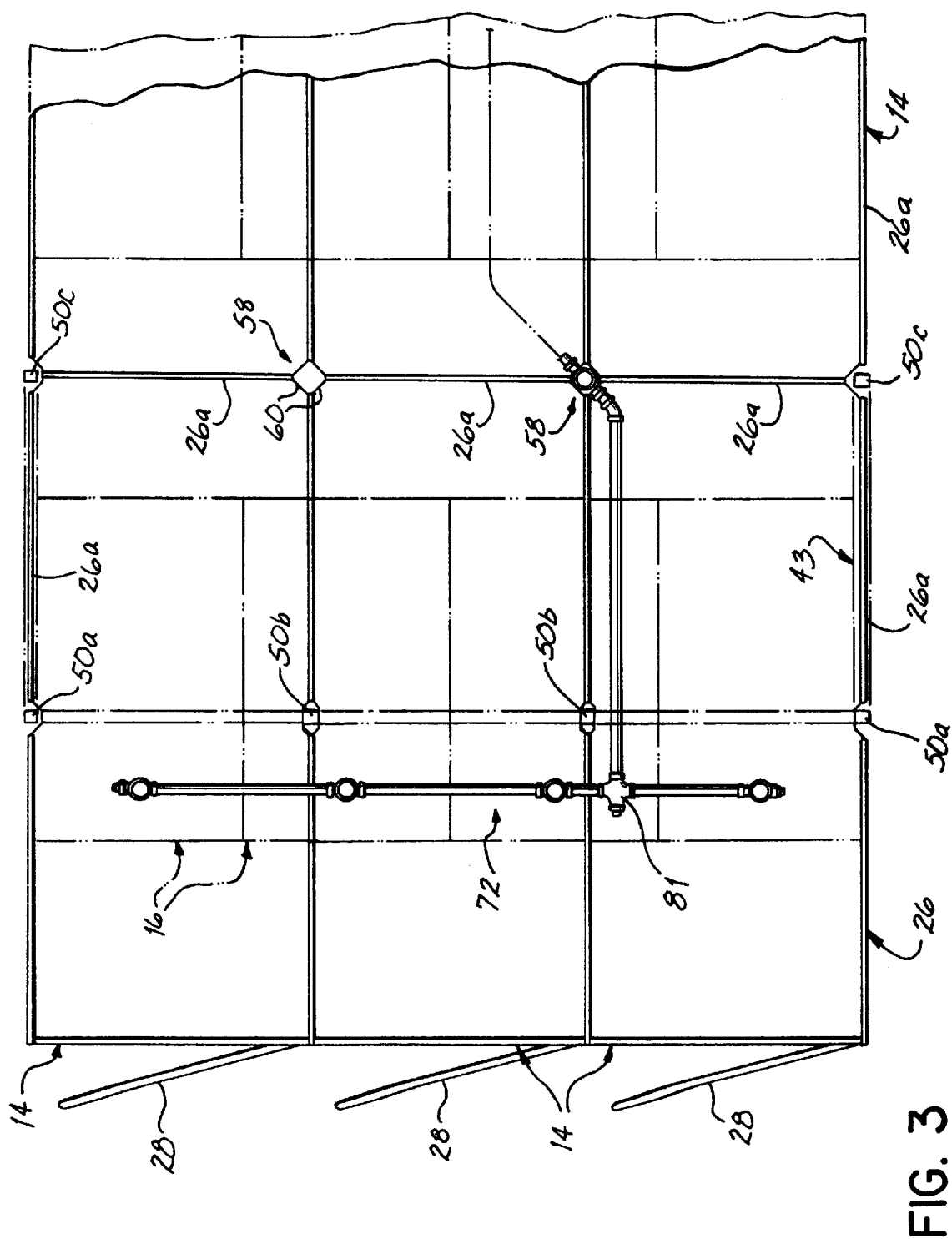
FIG. 3 is a diagrammatic top view of the lower section, but showing the upper section plumbing layout.

As seen in FIG. 3, the lower section 12a of the module is divided into plural lower animal runs 14. Each lower run 14 has lower walls 26 and a rear wall 30 constructed from lower wall sections 26a. The lower section 12a has a joint rear wall 30 constructed of the wall sections 26a. In the preferred embodiment, the lower section 12a of the module is subdivided into six discrete lower runs 14, however, it will be understood by those in the art that the lower section 12a can be subdivided into different numbers of lower runs 14 having a joint rear wall 30.

The joint rear wall 30 generally bisects the lower section 12a so that each lower run shares co-planar side walls 26 with an oppositely disposed lower run 14. This configuration allows the lower runs to have lower doors 28 hung in doorways 29 that open outwardly away from the oppositely disposed lower run 14 with which the rear wall 30 is shared. Each lower run 14 sits directly upon a floor 90 of any desired location having access to a suitable waste collection system. In the preferred embodiment, the lower run 14 remains open at its top but it will be understood by those in the art that the lower run 14 may be completely enclosed.

Figure 4:
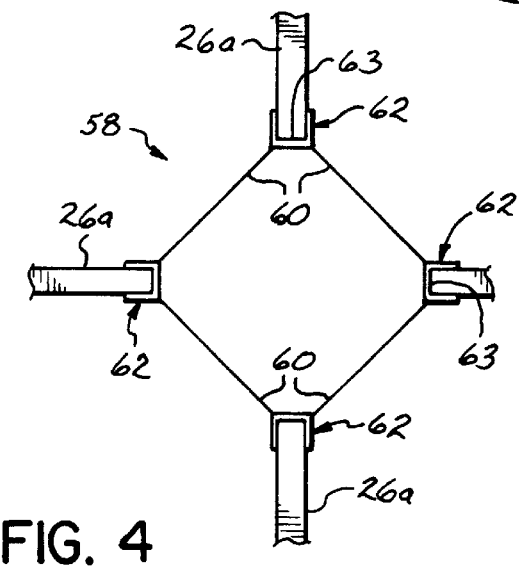
FIG. 4 is a top cross sectional view of a wall joint.
Figure 6:
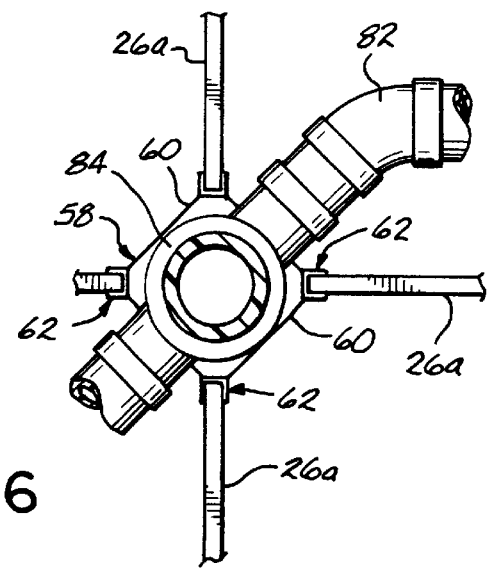
FIG. 6 is a cross sectional view of the catwalk drain assembly taken along line 6—6 of FIG. 5 assembled within the wall joint of FIG. 4.

The wall sections 26a are joined together by wall joints 58 as best seen in FIGS. 4 and 6. The wall joint 58 has a spanner 60 connected at its margins to a U-shaped spanner bar 62 that receives a wall section 26a margin within the spanner bar's longitudinal channel 63. The number of spanners 60 and spanner bars 62 required to form a suitable wall joint 58 is dependent on the number of wall sections 26a to be joined and the location of the wall joint 58, as seen in FIG. 3.

In the preferred embodiment, a floor gutter 88 proximate to the rear wall 30 allows a user 98 to simply hose out the lower run 14 and wash any waste into the waste collection system. The floor gutter 88 drains the wastewater into the waste collection system through floor drain 91.

Supported above the lower section 12a are upper sections 12b. An upper section 12b is divided into discrete upper runs 16, each upper run 16 having upper side walls 36, an upper rear wall 40, a bottom floor 34 received upon the support frame 43, and an upper door 38 hung in a doorway 39 that opens inwardly onto a catwalk 53 located generally above the joint rear wall 30 of the lower section 12a. In the preferred embodiment, the upper run 16 has a ceiling 32 (FIG. 7), but in an alternative embodiment, the upper run 16 remains open at its top. Also, in the preferred embodiment, each upper section 12b has four upper runs 16, but it will be understood by those in the art that an upper section 12b may have different numbers of upper runs 16.

The bottom floor 34 of each upper run 16 slants down and away from the upper doorway 39 toward a drain 74 located under a bench 66 proximate the rear wall 40. The bench 66 has a platform 67 reinforced at its front edge by a front angle 68 and at its rear edge by rear angle 70, as seen in FIG. 8. The bench 66 is hinged at the rear angle 70 so that it may be moved from a lowered position resting upon a stop bar 69 fixedly attached to the side walls 36 to a raised position (shown in phantom in FIG. 8) to facilitate thorough cleaning of the bottom floor 34.

In the preferred embodiment, both the upper runs and the lower runs are provided with pivotable benches 66 (See FIG. 2) covering the floor drains. In both upper and lower runs, the walls preferably are made from fiber reinforced plastic, available from Parkland Plastics, Middlebury, Ind. and molded structural foam mesh, available from Farm Tek, Dyersville, Iowa. As is understood by those in the art, the lower and upper sections 12a, 12b may be constructed from other materials suitable for animal boarding.

Each upper run 16 has a drain 74 defined in the bottom floor 34 connected to a plumbing system 72. The drain 74 allows a user 98 to wash waste into a drain pipe 76. Each drain pipe 76 is in fluid communication with a feeder pipe 80 by drain joint 78. Collection pipes 79 direct waste flow from the drain pipe 76 to the feeder pipe 80 with a collection joint 81 (see FIG. 3). The feeder pipe 80 is slanted downwardly from the collection joint 81 towards the joint rear wall 30 where the collected waste washes into a drain pipe 86 (see FIG. 2). The feeder pipe 80 is placed in fluid communication with the drain pipe 86 by a feeder joint 82 and a primary head 84. As seen in FIGS. 3 and 6, the primary head 84 and the drain pipe 86 are located within a wall joint 58 at the convergence of wall sections 26a. Each feeder joint 82 is received through a respective spanner aperture 61 to be placed in fluid communication with the primary head 84 located within the wall joint 58. The waste washed out of each upper run 16 flushes into the floor gutter 88 which empties into the floor drain 91 and, thereafter, into the waste collection system.

Figure 5:
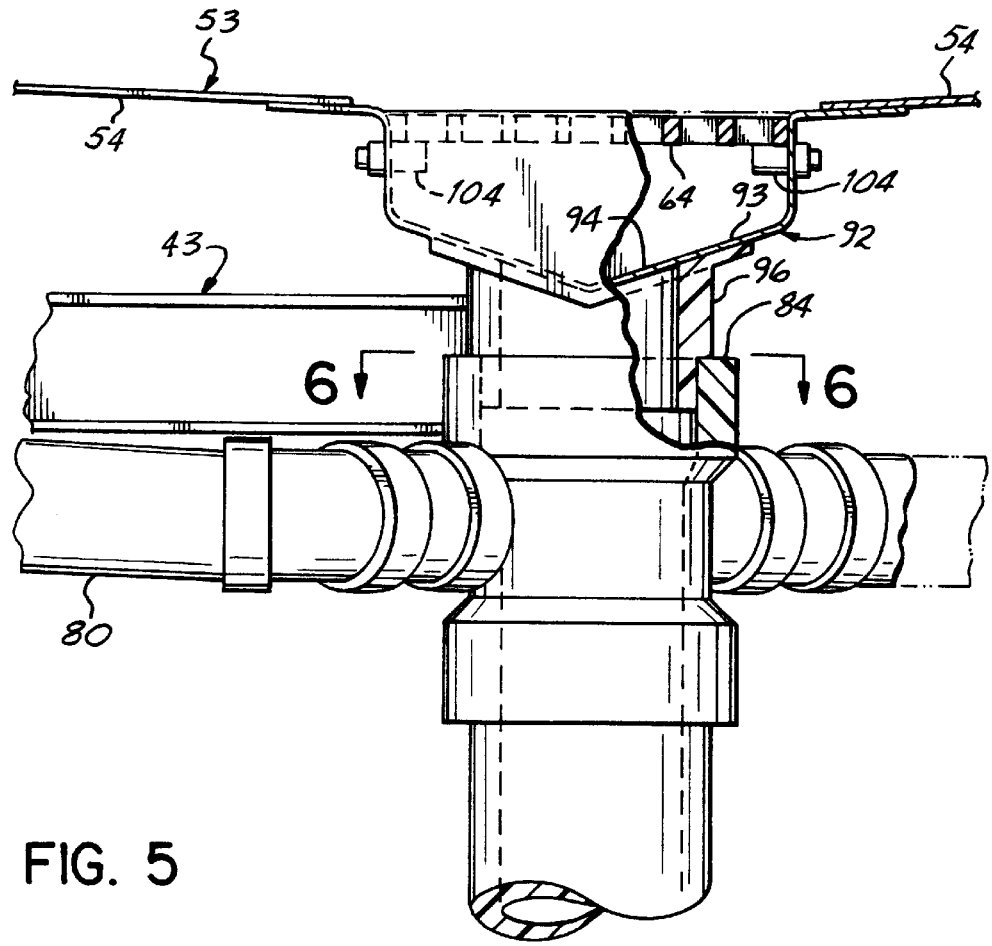
FIG. 5 is a partially broken away close up view of encircled area 5 of the catwalk gutter and central waste drain assembly of FIG. 2.

The upper run 16 opens onto a central catwalk 53 that has a central grate 64 running along the length of the catwalk 53. Each catwalk member 54 is angled downwardly from the flange 55 towards the catwalk grate 64 so that when the catwalk 53 is washed any waste spills into the catwalk gutter 92 through the catwalk grate 64. The catwalk grate 64 is suspended within the catwalk gutter 92 by bosses 104, as seen in FIG. 5. The catwalk gutter 92 defines a catwalk aperture 94 in fluid communication with a catwalk head 96 in fluid communication with the primary head 84.

In the preferred embodiment, the user 98 and animal boarder 101 gain access to the upper modular sections 12b by a set of stairs 102.

From the above disclosure of the detailed description of the present invention and the preceding summary of the preferred embodiment, those skilled in the art will comprehend the various modifications to which the present invention is susceptible. Therefore, I desire to be limited only by the scope of the following claims and equivalents thereof.

I claim:

1. A modular animal boarding system, comprised of:
   a lower section subdivided into at least one oppositely disposed lower run pair, said lower run pair comprised of a joint rear wall common to said lower run pair, and plural lower doorways opening outwardly relative to said joint rear wall, wherein a single said lower doorway is provided to a single said lower run;
   at least one upper section supported above said lower section, wherein each said upper section is subdivided into a plurality of upper runs, each said upper run comprised of an upper floor and an upper doorway opening inwardly relative to said joint rear wall;
   a catwalk above said lower section, said catwalk providing the user and the animal boarder treadable access to each of said upper runs; and
   a plumbing system through which the user may wash-out animal waste, each of said lower runs and upper runs being in fluid communication with said plumbing system, said plumbing system being adaptable for installation in any desired facility having access to a suitable waste collection system.

2. The boarding system of claim 1, further comprised of:
   a flip-up bench swingably mounted to at least one said upper rear wall and at least one said lower rear wall, said flip-up bench allowing the user to wash-out each of said lower and upper runs irrespective of the presence of the animal boarder.

3. The boarding system of claim 1, said plumbing system further comprised of:
   a drain located proximate said upper rear wall of each said upper run into which the user may wash-out the boarder's waste;
   at least one feeder pipe in fluid communication with said drain into which the boarder's waste is washed, said feeder pipe slanting downwardly and away from said upper rear wall towards said joint rear wall of said lower section;
   at least one drain pipe in fluid communication with said feeder pipe, wherein said drain pipe is in fluid communication with a suitable waste collection system.

4. The boarding system of claim 3, wherein a single drain pipe collects the waste from each of said upper sections.

5. The boarding system of claim 3, further comprised of:
   a collection pipe in fluid communication with at least one said drain and said feeder pipe to shunt the waste to said feeder pipe.

6. The boarding system of claim 1, further comprising of:
   a stair case to provide access for the user and the boarder to said catwalk and said upper runs.

7. An animal boarding system, comprised of:
   a lower section subdivided into a plurality of oppositely disposed lower run pairs, said lower run pairs comprised of a joint rear wall common to said lower run pairs and plural lower doorways opening outwardly relative to said joint rear wall, wherein a single said lower doorway is provided to a single said lower run;
   at least one upper section supported above said lower section, wherein each said upper section is subdivided into a plurality of upper runs, each said upper run comprised of an upper doorway opening inwardly relative to said joint rear wall, an upper wall, and an upper floor;
   a support frame to support said upper section above said lower section;
   a flip-up bench swingably mounted to each said upper rear wall and each said lower rear wall, said flip-up bench allowing the user to wash-out each of said lower and upper runs regardless of the presence of the boarder;
   a catwalk supported above said lower section, said catwalk comprised of at least one catwalk member slanting downwardly and away from said upper door, a grate through which the user may wash-out the boarder's waste, and a catwalk gutter having a catwalk aperture through which the boarder's waste spills;
   a staircase to provide access to said catwalk; and
   a plumbing system through which a user may wash-out the boarder's waste, each of said lower runs and upper runs being in fluid communication with at least a portion of said plumbing system, said plumbing system comprised of a drain located proximate said upper rear wall of each said upper run into which the user may wash-out the boarder's waste, at least one feeder pipe in fluid communication with said drain into which the boarder's waste is washed, at least one collection pipe in fluid communication with said drain and said feeder pipe to shunt the waste into said feeder pipe, said feeder pipe slanting downwardly and away from said upper rear wall towards said joint rear wall of said lower section, a single drain pipe in fluid communication with said feeder pipe, said drain pipe being in joint fluid communication with each of said upper sections and said catwalk drain, and a floor gutter into which the waste from said upper and lower runs is washed, said plumbing system being adaptable for installation into any desired facility having access to a suitable waste collection system.

8. A modular animal boarding system, comprised of:
   a lower section subdivided into at least one oppositely disposed lower run pair, said lower run pair comprised of juxtapositioned rear walls, and plural lower doorways opening outwardly relative to said juxtapositioned rear walls, wherein a single said lower doorway is provided to a single said lower run;

at least one upper section supported above said lower section, wherein each said upper section is subdivided into a plurality of upper runs, each said upper run comprised of an upper floor and an upper doorway opening inwardly relative to said outwardly opening doorways of said lower run pair;

a catwalk above said lower section, said catwalk providing the user and the animal border treadable access to each of said upper runs; and a plumbing system through which the user may wash-out animal waste, each of said lower runs and upper runs being in fluid communication with said plumbing system.

\* \* \* \* \*